United States Patent [19] [11] 4,275,274

English [45] Jun. 23, 1981

[54] AUDIO VISUAL MONITORING SYSTEM FOR ANNOUNCING A MESSAGE UPON DETECTION OF A MONITORED CONDITION

[76] Inventor: Tim G. English, 15 Valley Rd., R.D. 1, West Redding, Conn. 06896

[21] Appl. No.: 43,151

[22] Filed: May 29, 1979

[51] Int. Cl.[3] ........................ G11B 15/02; G11B 31/00

[52] U.S. Cl. ...................................... 369/22; 340/692; 360/12

[58] Field of Search ............... 340/692, 691, 500, 507, 340/508, 517, 519, 521, 19 A, 509, 506; 179/100.1 C; 360/12

[56] References Cited

U.S. PATENT DOCUMENTS

| | | | |
|---|---|---|---|
| 3,205,482 | 9/1965 | Taylor et al. | 340/692 |
| 3,209,324 | 9/1965 | Diamond et al. | 340/692 |
| 3,310,793 | 3/1967 | Takarabe et al. | 340/692 |
| 3,582,949 | 6/1971 | Forst | 340/692 |
| 3,879,704 | 4/1975 | Noji | 340/692 |
| 4,100,581 | 7/1978 | Slack et al. | 340/692 |

*Primary Examiner*—Raymond F. Cardillo, Jr.
*Attorney, Agent, or Firm*—Arthur T. Fattibene

[57] ABSTRACT

An audio-visual communicating system which comprises an illuminated sign containing printed information and including a plurality of recorded messages on a recording device, and which recording device is selectively activated by one or more detectors each monitoring a specific condition whereby an audio message corresponding to the sensed circuit is sounded. The system includes a circuit containing a primary source of electrical power and a secondary source of electrical power, the latter being in the form of a rechargeable battery and a charging circuit for maintaining a charge on the battery. The arrangement is such that the system is rendered operative whether or not there has been a failure of the primary power source.

4 Claims, 3 Drawing Figures

AUDIO VISUAL MONITORING SYSTEM FOR ANNOUNCING A MESSAGE UPON DETECTION OF A MONITORED CONDITION

PROBLEM & PRIOR ART

It is currently the practice to provide illuminated signs in places of public access, e.g. exit signs, directional signs, and various other signs which are intended to instruct the public of the various exits and/or areas of shelter and the like. Because of the development of fire codes and emphasis on public safety, building codes have been adopted in many areas that require such illuminated signs to remain illuminated at all times, even in the event of a power failure. This has been attained by either incorporating a self contained battery means within the sign or connecting the sign by separate sets of wires to an alternate source of emergency electrical power which may be either a centrally located AC or DC source. Such signs are generally provided in buildings to aid in emergency situations, e.g. fire. However, in case of emergency, such signs are of little or no value to the public if they cannot be seen or in the event they are obscured by smoke or by some physical structure, or cannot be seen by visual handicapped persons.

OBJECTS

An object of this invention to provide illuminated signs such as now required in many public buildings so as to further increase public safety by providing such signs with the capacity to announce intelligent audio messages and/or instructions in time of need or emergency.

Another object is to provide such signs with a plurality of different pre-recorded voice messages which can predeterminately selected or activated by an appropriate sensor or detector which is responsive to a particular condition, e.g. heat, smoke, gas, power failure and the like.

Another object is to provide an audio-visual device capable of increasing public safety by lessening the possibility of panic and confusion in cases of emergency.

Another object is to provide an audio-visual device which is relatively simple in construction, can be readily fabricated and which is positive in operation.

Another object is to provide an electric audio-visual system which is rendered operative even though there has been a power failure.

BRIEF SUMMARY OF THE INVENTION

The foregoing objects and other features and advantages are obtained by an audio-visual communicating system which comprises generally of an illuminated sign or the like e.g. an exit sign commonly used in public buildings, which includes also one or more recorded messages which can be readily sounded upon the happening of a given monitored condition, e.g. fire. This is attained by the inclusion of a recording device such as a tape transport having an endless tape loop upon which there is recorded one or more distinct audible messages. The audio portion includes one or more playback heads operatively connected to a playback amplifier and associated loudspeaker. Included in the electrical circuit for effecting control of both the illuminated and audio portion of the system is a primary and secondary source of electrical power, the latter comprising a rechargeable battery and appropriate charging circuit for maintaining a charge on the battery so as to maintain the battery in a stand-by state in the event of a power failure. Included in the circuit are one or more detectors for monitoring or sensing different conditions and which are operatively connected to appropriate relays or activators to effect the proper selection of the audio prerecorded voice messages corresponding or appropriate to the respective condition or emergency sensed. The arrangement is such that each of the respective prerecorded messages can be selectively activated in a specific predetermined order to priority in accordance with the importance of the emergency condition so that message having the highest predetermined priority in the event two or more emergencies or predetermined conditions are sensed simultaneously.

FEATURES

A feature of this invention resides in the provisions of an illuminated sign which includes a recording device which is rendered responsive to the happening of a predetermined monitored or sensed condition to give an audible intelligent message so as to minimize panic and confusion in case of emergencies such as fire and the like.

Another feature resides in the provision of an audio-visual communicating system which is electrically operated and which is capable of operation even in the event of a power failure.

Another feature of the invention resides in the provision of an illuminated sign which has the capability of making one or more audible intelligent messages corresponding to a particular sensed or monitored condition.

Another feature of the invention resides in the provision of an illuminated emergency sign which is also capable of making audio announcements of predetermined conditions upon the happening of such predetermined condition automatically whether or not such condition is accompanied by a general power failure.

Other features and advantages will become more readily apparent when considered in view of the drawings and specification in which.

Figure 1:
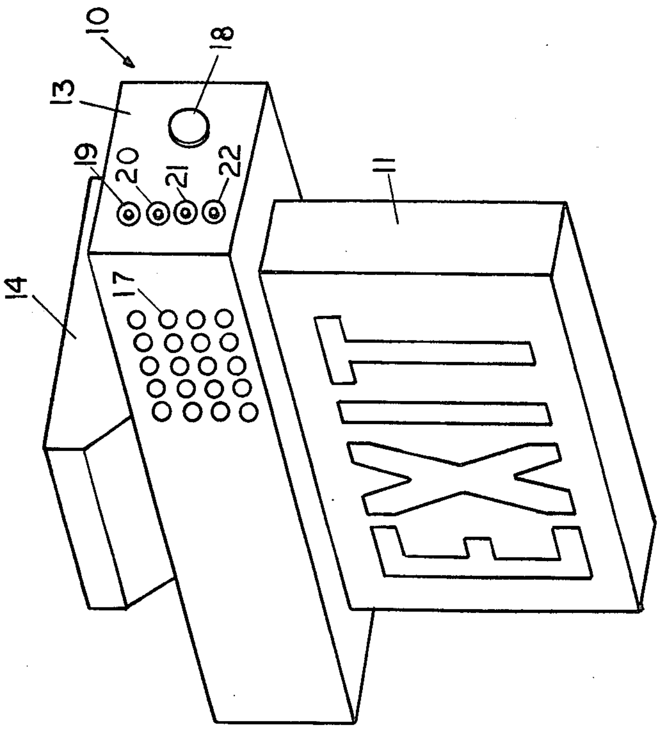
FIG. 1 is a perspective view of a device embodying the invention.
Figure 3:
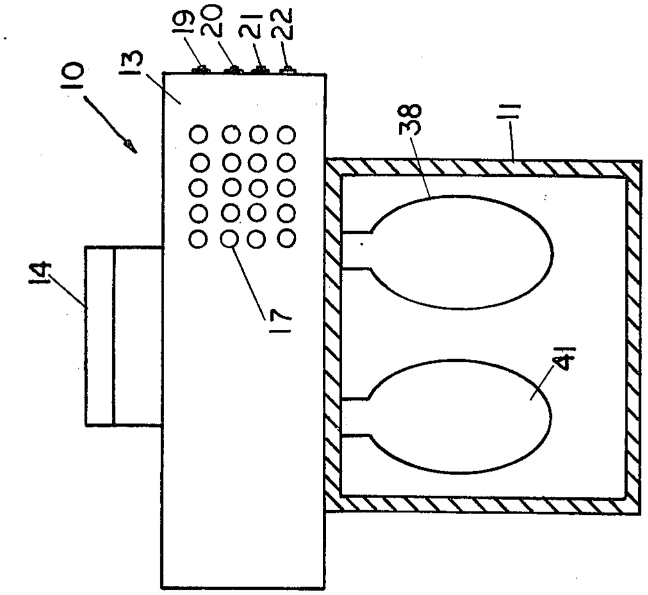
FIG. 3 is a section view of the device of FIG. 1.

Referring to the drawings and detail specification; there is illustrated a device 10 which comprises an illuminated sign, e.g. an exit sign which is commonly used in public buildings and the like to indicate to the public the various egresses of such buildings. While the device 10 is illustrated as an "exit sign" it will be understood that the device 10 may contain other printed informative material e.g. stairway, elevator, escalator, or any other printed message as desired. Because of various safety codes, such signs are required to be illuminated. For this reason such signs 10 are frequently provided with a suitable lamp or light bulb located within the sign housing 11.

In accordance with this invention such sign 10 is provided with a recording device 12 disposed in an accessory housing 13 from which the sign housing 11 depends, and a mounting bracket 14 is connected to housing 13. Operatively associated with the recording device 12 is a playback amplifier 15 and associated speaker 16. As best seen in FIG. 1, the housing 13 is provided with a speaker grid 17 adjacent to the speaker 16. Included on the accessory housing 13 also is an indicator light 18 and a series of test buttons 19, 20, 21, & 22 as will be hereinafter described.

Figure 2:
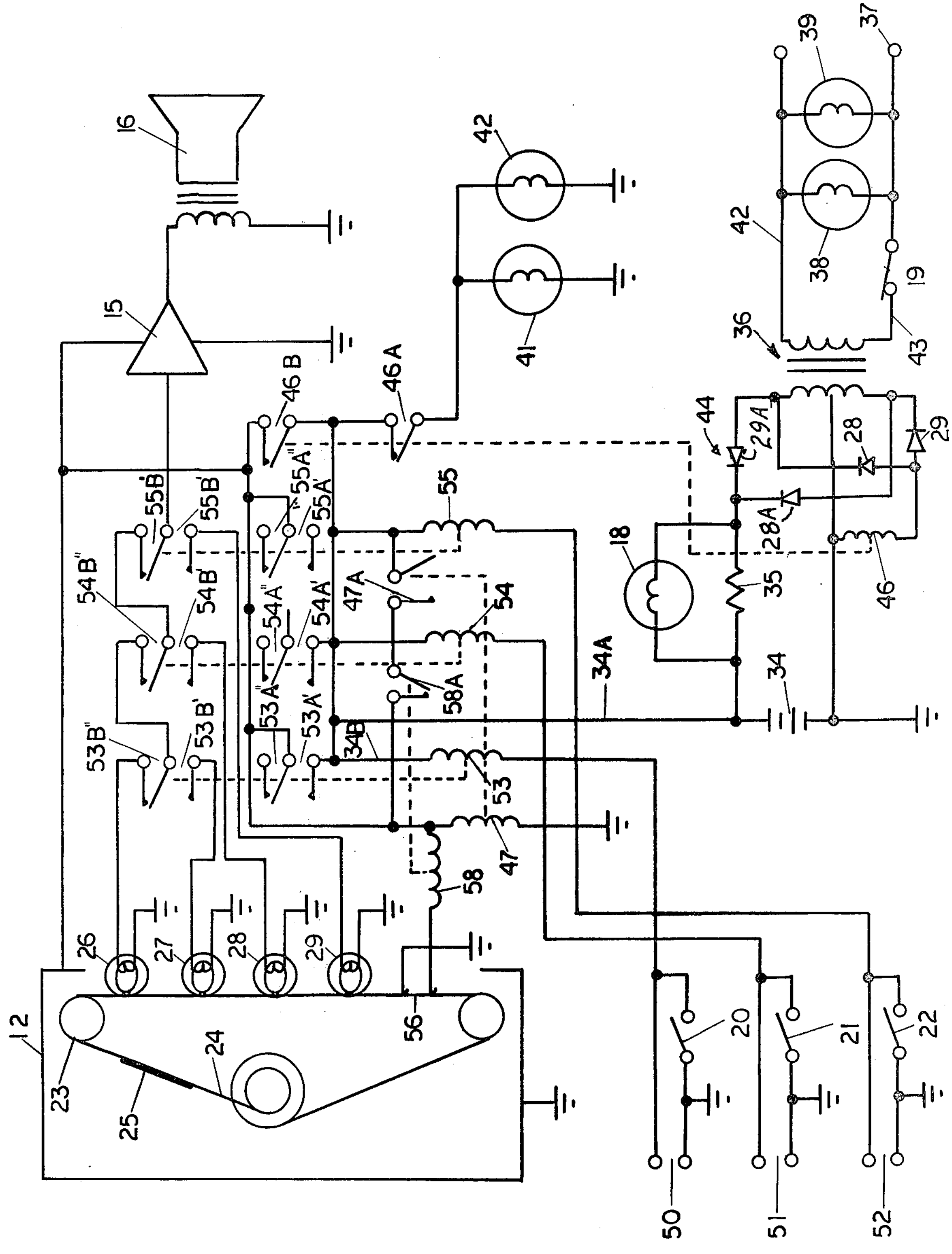
FIG. 2 is a diagram of an electrical circuit embodying the invention.

FIG. 2 illustrates the circuit diagram of a preferred embodiment. Included in the circuit diagram is a recording device illustrated in the form of a tape transport 23 having an endless tape loop 24, and a sensing foil 25. As will be hereinafter described, the tape loop 24 contains a plurality of prerecorded message which will be sounded or broadcasted upon the happening of a monitored or sensed condition. Associated with the tape loop 24, are a plurality of playback or pick-up heads 26, 27, 28, & 29, one such head being operatively associated with a corresponding prerecorded message. Also included in the circuit are a plurality of detectors or contact closure inputs 50, 51, and 52 which are responsive to corresponding external alarms for sensing various conditions, such as fire, smoke, heat, or other selected monitored condition. Associated with the respective contact closure inputs 50, 51, and 52 are control relay coils 53, 54, and 55 and associated contacts. Test switches 20, 21, and 22 are also provided for testing the respective contact closure input circuits.

The circuit also includes a stand-by rechargeable battery 34 and associated charging circuit 44 including a charging resistor 35 and associated diodes. A stepdown power transformer 36 couples the primary power source 37 e.g. a generator or AC line current to the standby battery or secondary power source 34. Maintained in the primary power circuit are one or more lamps 38 and 39 which may be physically disposed within the sign housing 11 to illuminate the sign. The secondary power source has in its circuit one or more D.C. lamps 41 and 42 which may also be physically associated within the sign and which D.C. lamps 41 and 42 are energized in the event of a power failure of the primary source 37. Connected in circuit of the primary 37 is a test switch 19.

Referring more specifically to the circuit diagram of FIG. 2, leads 42 and 43 connect the primary winding of the stepdown transformer 36 in circuit with the primary power source. Connected in parallel between leads 42 and 43 are one or more lamps 38 and 39. A test switch 19 is provided for testing the primary power circuit. Such test switch 19 can be physically located on housing 13 of the sign 10.

The secondary windings of the transformer 36 are suitably connected through a charging circuit 44 to a storage battery 34. It will be understood that the charging circuit includes a charging resistor 35 and associated diodes 28, 28A 29 and 29A. An indicator light 18 is connected in parallel with the charging resistor which is energized whenever the battery 34 is on charge. However, the charging circuit may take other forms.

Connected in circuit with the secondary winding of the transformer is a relay coil 46, which is energized when the test switch 19 is closed and the primary power source is operative. The relay coil 46 is co-operatively associated with normally open contacts 46A and 46B. Contacts 46A are in circuit with one or more D.C. lamps 41 and 42. Contacts 46B are in circuit with the motor of the tape transport 23; the playback amplifier 15; and a relay coil 47. The arrangement is such that when there is a failure of the primary power source or when the test switch 19 is momentarily opened; the relay coil 46 is de-energized causing contacts 46A and 46B to close. The closing of contact 46A energizes the emergency D.C. lamps 41, 42, which are supplied with power by the battery 34. The closing of contacts 46B energizes the tape transport and relay coil 47 and amplifier 15. Activation of the relay coil 47 effects the closing of its contacts 47A.

To effect the actuation of a given play back head for transmitting a particular message upon the sensing of a particular monitored condition; there is included in the respective play back circuits a sensor or detector contacts 50, 51, and 52 and an associated relay coil 53, 54, and 55 each operating two sets of relay contacts and each set including an open contact and a closed contact; e.g. 53A′; 53A″ and 53B′, 53B″; 54A′, 54A″ and 54B′; 54B″; and 55A′; 55A″ and 55B′, 55B″. The arrangement is such that whatever a particular sensor or detector contacts 50, 51, or 52 are closed by the actuation of a suitable alarm; its connected relay coil is energized causing the associate pair of closed contacts to open and the open contacts to close thereby causing the associated playback head to be rendered operative. For example, if the alarm controlling detector contacts 50 is actuated to cause contacts 50 to close, its associated relay coil 53 is energized thereby causing contacts 53A′ and 53B′ to close and contact 53A″ and 53B″ to open. When this occurs, the playback head 27 is placed in operation, and the audible message associated with the closing of the sensor contacts 50 is played.

In the illustrated circuit such audible message is played whether or not the primary power source is operative. When the condition monitored by the alarm activating sensor contacts 50 is removed, the associated relay coil 53 is de-energized causing its associated contacts 53A′ and 53B′ to return to their normal position. When this occurs, playback head 26 is rendered operative and its associated message is played until the sensing foil 25 on the endless tape loop 24 closes the contacts 56 to return the device to a standby mode as will be hereinafter described. Accordingly, the activation of playback heads 28 & 29 are similarly activated upon the closing of their respective sensor contacts 51 & 52 in response to the activation of their respective alarm upon the sensing of a particular monitored condition.

To test the respective sensing circuits, a sensing or testing switch 20, 21 & 22 is disposed in a series of each set of sensing contacts 50, 51, & 52, respectively.

When a selected recorded message has ended, the foil 25 on the endless tape loop will effect the closing of contacts 56 thereby energizing relay coil 58 which will open its associated contacts 58A. As contact 58A opens, relay coil 47 is de-energized to result in opening of its contacts 47A; whereupon relay coil 47 is de-energized to effect the opening of contacts 47A to place the unit in a standby condition.

From the foregoing description the operation of the audio-visual communicating system or device is as follows:

Under normal operation conditions or when operating under standby conditions, which is identified by the presence of its primary source or utility power 37, and its absence of any alarmed condition, the A.C. lamps 38, 39, in the device 10 are energized and the rechargeable battery 34 is being continuously charged by the transformer 32 and associated charging circuit which includes the charging resistor 35 and associated dioder 27A and 27B. To indicate battery charging, the indicator lamp or light 18 wired in parallel with the charging resistor.

When the utility or primary power source is lost or has failed for any reason or when the test switch 19 is momentarily opened to test the circuit, the relay coil 46 is de-energized and effects the closing of its contacts 46A and 46B. The closings of contacts 46A energizes the emergency D.C. lamps 41 and 42 which function to maintain the device 10 illuminated and the closing of contacts 46B energizes the transport mechanism 12 and the associated playback amplifier 15. Closing of contacts 46B also energizes relay coil 47 which effect the closing of its contacts 47A. With power now being supplied by the battery and with the closing of contacts 47A; the playback head 26 is selected to effect the announcement of the message track on tape 24 by transmission to the amplifier through contact 53B″, 54B″ and 55B″ to the loudspeaker 16. The selected message it will be understood would be one appropriate for announcing the conditions or instructions associated with the condition noticed i.e. failure of the primary power source.

When the primary or utility source of power is re-established, coil 46 is re-energized thus effecting the opening of contacts 46A and 46B. Opening of contacts 46A de-energize the D.C. lamps 41 and 42. Coil 47 is maintained energized by current flowing through leads 34A and 34B to maintain its contacts 47A closed until the sensing foil 25 advances to a position at the end of the selected recorded message to close contacts 56 which effects the de-energization of relay coil 58. Upon de-energization of coil 58, its contacts 58A open. Coil 47 is de-energized opening contacts 47A and coil 58 is de-energized to close contacts 58A. Thus when the device is placed in a stand-by condition until either the utility power source 37 again fails or until one or more of the sensing contacts 50, 51, or 52 are closed. In stand-by the tape transport or loop is positioned to start at the beginning of a recorded message.

In the event the sensing contacts 50 are closed by the actuation of a specific alarm; which is to monitor a particular condition upon the happening of such condition, or if test switch 20 is closed, relay coil 53 is energized which causes contacts 53A′ and 53B′ to close. Upon the closing of contacts 53A′ and 53B′, play back head 27 is selected for operation and the associated message responsive to the closing of contacts 50 is played whether or not the primary power source is present. When the alarm causing the closing of contacts 50 is removed, playback head 26 is re-selected and rendered operative to effect the playing of its recorded message until the sensing foil 25 effects the closing of the contacts 56 whereby the device is returned to a stand-by condition as hereinabove described.

In case contacts 51 as closed by an alarm monitoring another condition or if test switch 21 is closed, the relay coil 54 is actuated to close relay contacts 54A′ and 54B′. Upon the closing of contacts 54A′ and 54B′ playback head 28 is selected whether or not utility or primary power source 37 is operative or whether or not external contact 50 is closed. When the alarm activating contacts 51 is removed, relay coil 54 is de-energized causing its contacts to return to their respective initial position with playback head 26 remaining active until the sensing foil 25 returns to a closing position for contacts 56, thus returning the device to a stand-by mode as hereinbefore described.

If contacts 52 are closed by the actuation of an alarm monitoring a condition to be sensed thereby or if switch 22 is closed; relay coil 55 is energized to close relay contacts 55A′ 55B′. Upon the closing of these contacts, playback head 29 is activated without regard to the status of the other alarm or the utility power source 37. Upon the removal of the alarmed condition activating contacts 52, playback head 26 is re-energized as hereinbefore described, and the device being returned to stand-by condition when the foil 25 causes the closing of contacts 56 upon completion of the recorded message.

From the foregoing description and showing of the electrical diagram of FIG. 2, it will be noted that only one playback head can be activated at a time, and each head is given a specific priority according to the importance of the alarm function which is prearranged upon the installation of the unit. For example, the alarm associated with the closing of contacts 52 can hold the highest priority and will override any other alarm which may actuate contacts 51 or 50. The alarm with associated contacts 51 will have a higher priority than the alarm associated with contacts 50; but can be overridden by the alarm associated with contacts 52.

The alarm associated with contacts 50 will have a higher priority than the power failure of source 37, but may be overridden by the closing of either contacts 51 or 52. The power failure is given the lowest priority and it can be overridden by the presence of any other alarm activity contacts 50, 51, or 52. In each case, however, the corresponding recorded message is played as hereinbefore described.

While the illustrated embodiment has been described with a tape transport as the recording device, it will be understood that other forms of recording or message devices may be used in lieu of a tape recorder. For example, the audible voice messages may originate from such sources as mechanical transcription, magnetic tape loop as shown, cassette, cartridge, reels, computer drum, disc, digitally stored intelligence in an integrated circuit read-only-memory (ROM), charge coupled devices, "bubble" memory or live microphone. It will also be understood that the device may be a wholly self-contained unit or that a plurality of units can be wired so that the secondary power source can be a centrally located power system or an alternate source of A.C. power other than that of the primary source.

While the invention has been described with respect to a particular embodiment, various modification and variation can be made without departing from the spirit or scope of the invention.

What is claimed in:

1. An audio-visual communicating system for monitoring and announcing a warning upon the detection of a predetermined monitored condition comprising a sign means, an AC lamp and a DC lamp for illuminating said sign, a tape transport means having an endless tape containing a plurality of recorded messages, a plurality of tape heads operatively associated with said endless tape, a playback amplifier and associated speaker, an electrical circuit electrically connecting said tape heads to said playback amplifier and associated speaker and for selectively energizing said AC or DC lamps, said electrical circuit including a primary power source and a secondary power source, said secondary power source comprising a storage battery; a charging circuit included in said electrical circuit for maintaining a charge on said battery, and said AC lamp being in circuit so as to be energized by said primary power source, and said DC lamp being in circuit so as to be energized by said battery upon failure of said primary power source, switch means disposed in said circuit for energizing said tape transport and said D.C. lamp in the event of a failure of said primary power source, whereby one of said tape heads is rendered operative to transmit an audio message on said tape to said speaker, a detector connected in circuit to each of the other tape heads, means operatively connected to each said detectors and with corresponding tape heads for selectively activating its corresponding tape head upon the sensing of a condition monitored by a respective detector, and means for de-energizing said circuit when the detector de-senses the monitored condition.

2. An audio visual communicating system as defined in claim 1 wherein each of said heads has a specific priority in accordance with the importance of the monitored condition.

3. An audio-visual communicating system for monitoring and announcing a warning upon the detection of a predetermined monitored condition comprising a sign means, an AC lamp and a DC lamp mounted in said sign for alternately illuminating said sign, a recording device containing a plurality of recorded messages, a playback amplifier and associated speaker, a plurality of recording head means operatively associated with said recording device, and an electrical circuit electrically connecting said recording device and associated recording head means in circuit with said playback amplifier and speaker, said electrical circuit including a primary source of AC power, said AC lamps being in circuit with said AC power, and a switch means for opening and closing the circuit to said AC lamp, a stepdown transformer means in said A.C. circuit, a charging circuit, said transformer having a primary winding in said AC circuit and a secondary winding in said charging circuit, means in said charging circuit for rectifying the current said DC lamp being in circuit with said charging circuit, a battery in said charging circuit whereby said DC lamp is energized by said battery upon failure of said primary power source, relay means interposed in said circuit between said battery and said DC lamp to effect the energizing of said DC lamp upon failure of said primary power source and the actuation of one of said recording heads and associated playback amplifier and speaker for sounding an audible intelligent message associated with said primary power failure, detector means connected in circuit with each of the other recording head means, relay means interposed in said circuit between each of said other recording head means and the play back amplifier and associated speaker, whereby the sensing of a predetermined monitored condition by said detecting means causes its associated relay means to activate the associated recording head means to sound one of said messages, said relay means being wired so that the actuation of said recording head means have a predetermined order of priority; and means for deactivating the circuit to return the circuit back to a stand-by condition.

4. An audio-visual communicating system for monitoring and announcing an audible message upon the detection of a predetermined monitored condition comprising a sign means, an AC lamp and a DC lamp for illuminating said sign means, a message storing means having one or more messages; a playback amplifier and associated speaker, an electrical circuit electrically connecting said message storing device to said playback amplifier and associated speaker and for selectively energizing said AC or DC lamps, said electrical circuit including a primary power source and a secondary power source, said secondary power source comprising a storage battery; a charging circuit included in said electrical circuit for maintaining a charge on said battery, and said AC lamp being in circuit so as to be energized by said primary power source, and said DC lamp being in circuit so as to be energized by said battery upon failure of said primary power source, switch means disposed in said circuit for energizing said message storing means and said D.C. lamp in the event of a failure of said primary power source whereby said message storing device is rendered operative to transmit an audio message to said speaker, one or more detectors corresponding in number at least to the number of said stored messages connected in circuit with said message storing device whereby each detector. monitors a predetermined condition, means operatively connected to each detector and with said message storing device for activating said message storing device to sound the message monitored by said detector upon the sensing of a condition monitored by said detector, and means for de-energizing said circuit when the detector de-senses the monitored condition.

* * * * *